United States Patent [19]

Cochran, Jr.

[11] Patent Number: 5,204,003
[45] Date of Patent: Apr. 20, 1993

[54] SEPARATION PROCESSES USING EXPULSION FROM DILUTE SUPERCRITICAL SOLUTIONS

[75] Inventor: Henry D. Cochran, Jr., Oak Ridge, Tenn.

[73] Assignee: The United States of America as represented by the United States Department of Energy, Washington, D.C.

[21] Appl. No.: 697,031

[22] Filed: May 8, 1991

[51] Int. Cl.⁵ .............................................. B01D 61/00
[52] U.S. Cl. ................................... 210/651; 210/661; 55/75; 55/16; 55/17
[58] Field of Search ............... 210/649, 650, 653, 654, 210/640, 661, 671, 651, 632; 55/74, 16, 75, 17, 158, 197, 44; 423/351, 579; 252/71

[56] References Cited

U.S. PATENT DOCUMENTS

| | | | |
|---|---|---|---|
| 3,925,036 | 12/1975 | Shacter | 55/158 |
| 3,953,568 | 4/1976 | Seko et al. | 423/351 |
| 3,955,943 | 5/1976 | Pontius | 55/16 |
| 3,973,928 | 8/1976 | Nierenberg et al. | 55/158 |
| 3,973,934 | 8/1976 | Nierenberg | 55/158 |
| 3,976,451 | 8/1976 | Blackmer et al. | 55/158 |
| 4,101,375 | 7/1978 | Garwin | 252/71 |
| 4,280,984 | 7/1981 | Miyake et al. | 423/351 |
| 4,469,496 | 9/1984 | Frischmuth et al. | 55/197 |
| 4,548,799 | 10/1985 | Knoblauch et al. | 423/351 |
| 4,659,343 | 4/1987 | Kelly | 210/640 |
| 5,057,225 | 10/1991 | Van Hook et al. | 210/640 |

OTHER PUBLICATIONS

Helium-3 and Helium-4 William E. Keller Plenum Press, N.Y., 1969, p. 37-37.
J. Chem. Phys. 90 (8), Apr. 15 1989, Pablo G. Debenedetti et al. Attractive, weakly attractive, and repulsive near-critical systems.

*Primary Examiner*—Robert A. Dawson
*Assistant Examiner*—Ana M. Fortuna
*Attorney, Agent, or Firm*—Katherine P. Lovingood; Stephen D. Hamel; William R. Moser

[57] ABSTRACT

A process for separating isotopes as well as other mixtures by utilizing the behavior of dilute repulsive or weakly attractive elements of the mixtures as the critical point of the solvent is approached.

12 Claims, 2 Drawing Sheets

SEPARATION PROCESSES USING EXPULSION FROM DILUTE SUPERCRITICAL SOLUTIONS

This invention relates to separation processes and particularly to isotope separation processes performed near the critical point of solvents for separation of solutes therefrom, and was developed pursuant to a contract with the United States Department of Energy, contract number DE-AC05-84OR21400, and funded under WPF number ERKCT07.

BACKGROUND OF THE INVENTION

Because different isotopes of an element have almost identical chemical characteristics and differ mainly in their atomic mass, their separations are among the most difficult to achieve. Uranium isotopes are separated for military and power production purposes. Isotopes of other elements useful in research, medicine and commercial applications are separated at high cost and in small quantities.

Two types of separation processes are now being used to separate isotopes. The first requires many repetitions, referred to as "stages", of a separation process that effects a slight enrichment of one isotope at each stage. Examples of these repetitive separations are gaseous diffusion, gas centrifuge, thermal diffusion, ion exchange, and supersonic nozzle processes. These are expensive due to the many separation stages required.

The second type requires the precise control of process parameters in order to effect a satisfactory separation in a single stage. Electromagnetic and laser isotope separation processes fall into this category. These processes are expensive largely due to the cost to maintain the required degree of control of a single stage.

There is thus a need to provide a process for separating isotopes of elements that is simple and less costly than existing methods.

SUMMARY OF THE INVENTION

In view of the above needs, it is an object of this invention to provide a process for separating isotopes and other gaseous molecules in a single easily controlled step.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the process of this invention may comprise, in a solution where molecules of the dilute solute exhibit repulsive or weakly attractive behavior relative to molecules of the solvent as the critical point of the solvent is approached, a process for separating the solute from the solvent by bringing a dilute solution to a temperature and pressure approaching the critical point of the solvent thus effecting a maximization of the fugacity of the dilute solute. This solution can then be separated using conventional techniques. In general, the solution is contacted with a medium, the medium being characterized by its ability to admit solute but its inability to enter the solution. The medium could be another phase or perhaps a permeable barrier. The gas solution must be one that has an attainable vapor-liquid critical point, that is, is chemically stable at its critical point and the critical point is at an attainable temperature and pressure.

Examples of possible solutes and solvents that can be separated are, respectively: $^3$He and $^4$He; $PD_3$ and $PH_3$; $AsD_3$ and $AsH_3$; $D_2O$ and $H_2O$; HDS and $H_2S$; $D_2S$ and $H_2S$; HDSe and $H_2Se$; DCl and HCl; DBr and HBr; DI and HI; $^{40}$Ar and $^{36}$Ar; $^{85}$Kr and natural Kr; $^{13}CF_4$ and $^{12}CF_4$; $^{36}SF_6$ and natural $SF_6$; $^{15}N_2$ and $^{14}N_2$; $^{18}O_2$ and $^{16}O_2$; $^{17}O_2$ and $^{16}O_2$; $O_2$ and $N_2$; and $H_2$ and $CO_2$.

The invention is also a process for separating mixtures having solute molecules that are not dilute repulsive or weakly attractive relative to the solvent molecules by creating a dilute repulsive or weakly attractive effect. This is done by recycling the solute product or byproduct stream to change the concentration of the mixture and convert it to a dilute repulsive or weakly attractive solution. Examples of possible solutes and solvents that can be separated using this recycling method are, respectively: $^{235}UF_6$ and $^{238}UF_6$, HD and $H_2$; $D_2$ and $H_2$; $^6$Li and $^7$Li; $^{22}$Ne and $^{20}$Ne; $^{11}B_2H_6$ and $^{10}B_2H_6$; $^{11}BF_3$ and $^{10}BF_3$; $^{37}Cl_2$ and $^{25}Cl_2$; and $^{50}VF_5$ and $^{51}VF_5$.

The above identified solute and solvent pairs are intended to be illustrative and not in any way to limit the scope of the claims. Other pairs could be easily imagined by persons of ordinary skill in the art.

DETAILED DESCRIPTION OF THE PREFERRED EMBODIMENT

Figure 1:
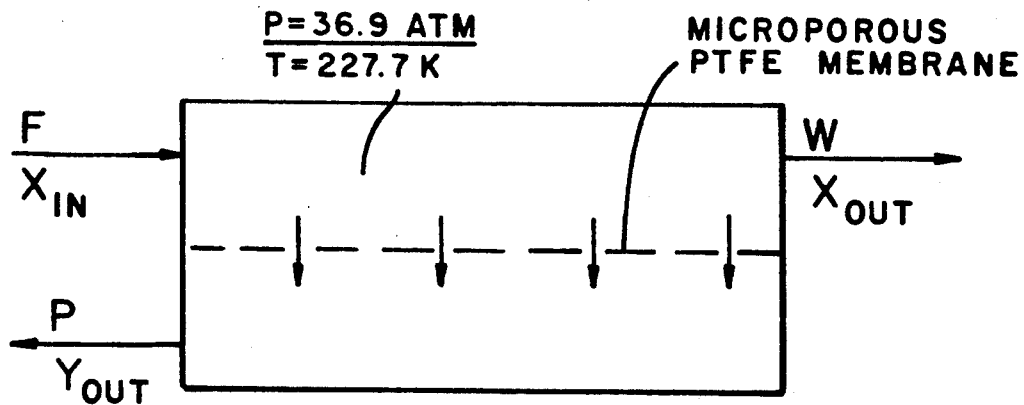
FIG. 1 is a diagram of a separation process for dilute weakly attractive isotope mixtures.

At a certain temperature and pressure, liquid is in equilibrium with its vapor. The equilibrium pressure is the vapor pressure of the liquid. The liquid is more dense than the vapor; however, if the temperature is increased then the density of the liquid decreases. Simultaneously, the density of the gas increases as the vapor pressure increases until a point is reached where the densities are the same and no distinction can be made between liquid and vapor phase. Above this temperature the substance is referred to simply as a fluid.

The temperature and the vapor pressure at which the distinction between phases ceases are referred to as the critical temperature and critical pressure, respectively. Above the critical temperature, pressure can be increased but there will not be a formation of a liquid phase, only compression of the fluid.

The critical temperature and critical pressure define a unique point for a given substance, termed the "vapor-liquid critical point", or the "critical point" for short. Near the critical point the behavior of the substance is dramatically different from normal behavior.

A supercritical solution is one that is at a temperature above the critical temperature. The pressure of the supercritical solutions of the invention is close to the critical pressure, although in general, the pressure of supercritical solutions may be higher or lower. Dilute solutes in a supercritical solution are known to exhibit one of three types of behavior: attractive, weakly attractive, and repulsive behavior. The process for this invention relates to solutions that exhibit either weakly attractive or repulsive behavior. The repulsive or weakly attractive behavior of certain dilute solutions near the critical point of the solvent raises the potential for new separation processes that may be a significant improvement over existing processes.

Both theory and experiment have shown that if the molecules of a dilute solute in a supercritical solvent attract molecules of the solvent more strongly than the solvent molecules attract each other, then a dilute, attractive supercritical solution will be formed. The local density of the solvent molecules about each solute molecule will be higher than the bulk average, the number of excess solvent molecules around each solute molecule increasing without bound as the critical point of the solvent is approached more and more closely.

Conversely, there exist supercritical solutions in which the molecules of a dilute solute attract molecules of the solvent substantially less strongly than the solvent molecules attract each other; thus a dilute repulsive supercritical solution is formed. Existence of dilute repulsive supercritical solutions has been proven experimentally, but no useful applications are known to have been reported. The local density of solvent molecules about each repulsive solute molecule will be lower than the bulk average, the deficit of solvent molecules around each solute molecule increasing without bound as the critical point of the solvent is approached.

There also exists supercritical solutions in which the molecules of a dilute solute attract molecules of the solvent just slightly less strongly than the solvent molecules attract each other; thus a dilute weakly attractive supercritical solution is formed. Existence of dilute weakly attractive supercritical solutions has been proven but no useful applications are known to have been reported. The local density of solvent molecules around each weakly attractive solute molecule will be higher than the bulk average but not as high as around each solvent molecule. Thus, the local fraction of molecules that are solvent molecules around a dilute weakly attractive solute molecule will approach zero and the local fraction that are other molecules will approach one as the critical point of the solvent is approached.

It is known that when a dilute solute and solvent differ only in that the solute contains an isotope that is dilute in the natural isotopic abundance and the solvent contains the predominant isotope, the solute is either attractive or weakly attractive. The subject invention may be best applied when an isotopically dilute solute is weakly attractive with respect to the solvent which contains the predominant isotope. If the gas is an atomic fluid, such as argon, the heavier isotope, if dilute, behaves as a weakly attractive solute. Thus $^{40}Ar$ behaves as a dilute weakly attractive solute in the predominant isotope $^{36}Ar$ as the argon critical point is approached. In the case where the gas is a molecular fluid such as carbon tetrafluoride, whether or not the molecule containing the dilute isotope will behave as an attractive or as a weakly attractive solute is not easy to predict. There are expected to be roughly as many cases in which the dilute isotope behaves as an attractive solute as cases in which it behaves as a weakly attractive solute. Despite uncertainty in the case of molecular fluids, it is believed that $^{13}CF_4$ will behave as a dilute weakly attractive solute in supercritical $^{12}CF_4$.

Separations for gases other than isotopes may also be possible, such as separating $O_2$ from air. It may also be desirable to separate $H_2$ from shifted synthesis gas. Synthesis gas is produced industrially by the partial oxidation of carbonaceous or hydrocarbonaceous fuels and is rich in carbon monoxide and hydrogen. The proportion of hydrogen to carbon monoxide can be shifted by reaction with steam.

Consider a very dilute mixture of solute 1 in solvent 2. The molecular characteristics are such that near the critical point of 2 the system yields a repulsive or weakly attractive mixture. If one tries an actual pair of components and finds that the mixture behaves attractively, then theoretically if the concentrations are reversed, making a dilute mixture of 2 in solvent 1, the result is a mixture that behaves repulsively or weakly attractively as the critical point of 1 is approached.

In a mixture containing a repulsive or weakly attractive solute, as the critical point of the solvent is approached the solvent molecules will tend to avoid the vicinity of the solute molecules and the solute molecules will tend to aggregate.

Suppose a compound having an element that occurs in two isotopic forms comprises a solution of dilute isotope-containing solute molecules in a predominant isotope-containing solvent. It would be expected that the difference in attraction between the two isotopic forms would be so small as to be negligible; however, the difference is finite and can be exploited. No matter how small, the effect of the difference can be made progressively larger as the critical point of the solvent is approached.

In a solution where molecules of the dilute solute exhibit repulsive or weakly attractive behavior relative to molecules of the solvent, the fugacity of the dilute solute is maximized as the critical point of the solvent is approached. The fugacity is a scientific measure of the tendency of a material to escape to another phase. Thus, the closer to the critical point, the greater will become the fugacity without bound.

One example of this invention is the separation of isotopes using a permeable membrane. A naturally occurring isotopic mixture is placed in a container that is suitable for controlling temperature and pressure sufficiently so that the critical point of a compound can be approached. Examples of isotopic mixtures are $^{13}CF_4$ in $^{12}CF_4$, $^{15}N_2$ in $^{14}N_2$, and $^{18}O_2$ and $^{17}O_2$ in $^{16}O_2$. The container is separated into two sections by a permeable membrane such as microporous polytetrafluoroethylene (PTFE). The mixture is introduced to one side of the membrane, this side being held at a temperature and pressure approaching the critical point of the compound. The compound containing the dilute repulsive or weakly attractive isotope will migrate away from the compound containing the predominant isotope thus causing a preferential permeation of the compound containing the dilute repulsive or weakly attractive isotope through the membrane, resulting in a fluid enriched in the compound containing the dilute repulsive or weakly attractive isotope. The enriched isotope and the depleted feed are withdrawn from the separation units. Flow rates, isotope compositions, and temperature and pressure conditions may be optimized within the limits of material balances, that is, by applying the law of conservation of mass to the overall mass flows as well as to the mass flows of each element.

A particularly important isotope separation is the enrichment of $^{235}UF_6$ from $^{238}UF_6$. Unfortunately it is predicted that the desired isotope forms a dilute attractive mixture at the naturally occurring isotope composition 0.720% $^{235}UF_6$ in 99.275% $^{238}UF_6$. To deal with this case the process would require introducing the naturally occurring mixture into the same container but at a high recycle rate relative to the introduction of feed material. A very small amount of $^{235}UF_6$ is removed from the container relative to the depleted feed, but it is recycled to a high concentration of $^{235}UF_6$ in the container. Because of this high rate of recycle, the $^{238}UF_6$ becomes a dilute weakly attractive solute in the $^{235}UF_6$ and is preferentially expelled from the container thereby enriching the product in $^{235}UF_6$ and rejecting the $^{238}UF_6$. This will be more clearly illustrated in Example 2.

Another type of separation that is possible is that of gas mixtures that will be described in the examples. The development can be applied in a cascade for separation of multicomponent gas mixtures.

Each of the above described cases requires a medium through or into which the solute can pass and which is negligibly soluble in the supercritical fluid. In addition to permeable membranes two other media have been identified.

The medium can be a solid having negligible vapor pressure with which the fluid reacts reversibly to form a product having negligible vapor pressure. The fluid is brought close to the critical point where, because of increased fugacity, the dilute weakly attractive or repulsive solute tends to react preferentially with the solid, the degree of preferential reaction increasing without limit as the critical point is approached. After equilibration with the supercritical solution the solid phase is removed from the fluid by conventional means and the enriched fluid is recovered from the solid by reversal of the reaction.

The medium can also be a solid sorbent with a significant capacity for the substance of the supercritical fluid but with negligible vapor pressure. The fluid is brought near the critical point where, because of increased fugacity, the dilute weakly attractive or repulsive solute tends to sorb preferentially within the solid, the degree of preferential sorption increasing without limit as the critical point is approached. After equilibration with the supercritical solution the solid sorbent is removed from the fluid by conventional means and the enriched fluid is recovered from the sorbent by desorption.

The processes described in the following examples are intended to be illustrative and not in any way a limitation on the scope of the invention. Persons of ordinary skill in the art should be able to envision variations on the general principle of this invention that fall within the scope of the generic claims the follow. The term "sufficient" and its derivatives are used to indicate expected allowances for these variations.

EXAMPLE 1

Referring to FIG. 1, F is 1 kg/h of naturally occurring $CF_4$ with $x_{in} = 1.10\%$ $^{13}CF_4$. At a pressure of 36.9 atm and a temperature of 227.7K, if $y_{out}$ is optimized at 99.0% $^{13}CF_4$ and $x_{out}$ is optimized at 1.00% $^{13}CF_4$, by material balances the product flow rate is 0.001 kg/h 99.0% $^{13}CF_4$ and the depleted stream flows out at 0.999 kg/h.

EXAMPLE 2

Figure 2:
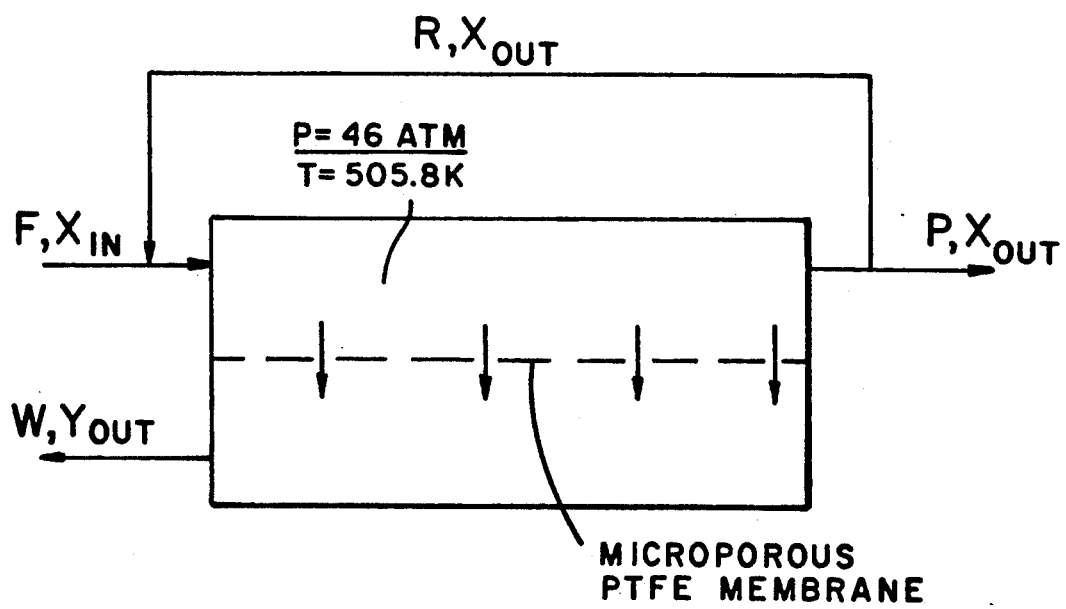
FIG. 2 is a diagram of a separation process for dilute attractive isotope mixtures.

To deal with the recovery of an isotope that is attractive, such as enrichment of $^{235}UF_6$ from $^{238}UF_6$, the process involves a recycle scheme as illustrated in FIG. 2. F is 1 kg/h of naturally occurring $UF_6$ with $x_{in} = 0.720\%$ $^{235}UF_6$, at a pressure of 46 atm and a temperature of 505.8K; $x_{out}$ is optimized at 99.00% $^{235}UF_6$ and $y_{out}$ is optimized at 0.200% $^{235}UF_6$ with a recycle feed ratio of 1000, the product flow rate is about $1 \times 10^{-4}$ kg/h of 99.00% $^{235}UF_6$ and the depleted stream flows out at about 0.9999 kg/h of 0.200% $^{235}UF_6$. By the high recycle rate the mixture on the high pressure side of the membrane is maintained as a dilute weakly attractive mixture of $^{238}UF_6$ in $^{235}UF_6$ even though the feed is a dilute attractive mixture of $^{235}UF_6$ in $^{238}UF_6$.

EXAMPLE 3

Figure 3:
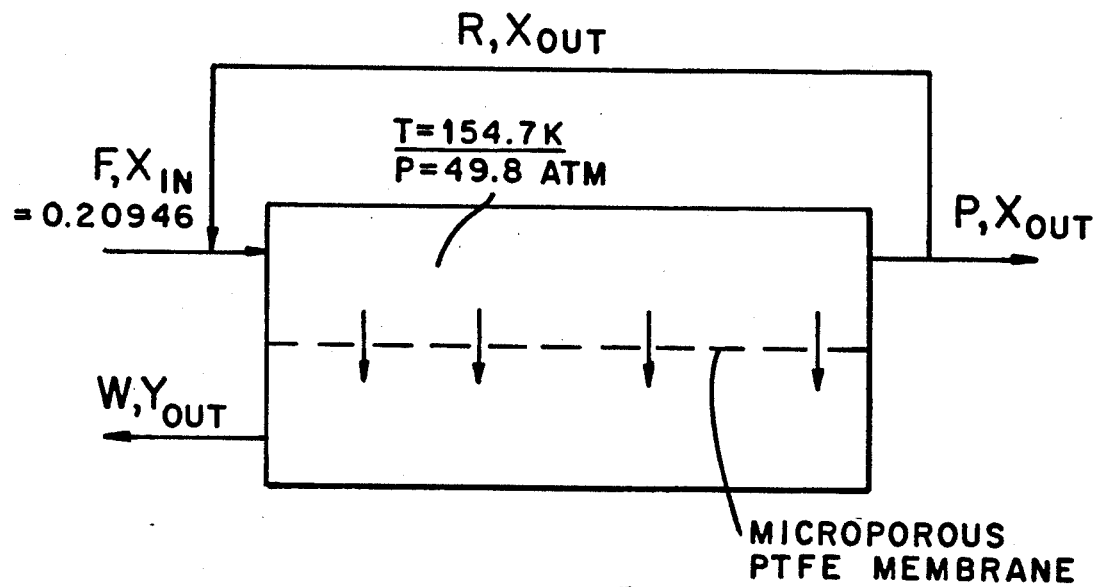
FIG. 3 is a diagram of a separation process for the dilute repulsive gas mixture of $O_2$ from air.

Oxygen is separated from air which is 20.946% $O_2$ and 78.084% $N_2$. To make a dilute, repulsive, supercritical mixture some recycle is required. To obtain a feed mixture of 1% $N_2$ in 99% $O_2$ as the dilute, repulsive gas mixture, a system as shown in FIG. 3 may be used. At a pressure of 49.8 atm and a temperature of 154.7K, the separation scheme is contemplated to be optimized where $x_{in} = 0.20946$ to produce the product stream P at $x_{out} = 0.999$ $O_2$ from a feed stream F flowing at 1 kg/h with a byproduct stream W flowing at 0.78 kg/h of essentially pure $N_2$. Then the product stream P flow at 0.21 kg/h; the required recycle rate is 86.7 kg/h.

EXAMPLE 4

$H_2$ is separated from shifted synthesis gas produced by steam reforming of methane

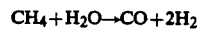

and that the synthesis gas was shifted

to give a net, shifted synthesis gas

Figure 4:
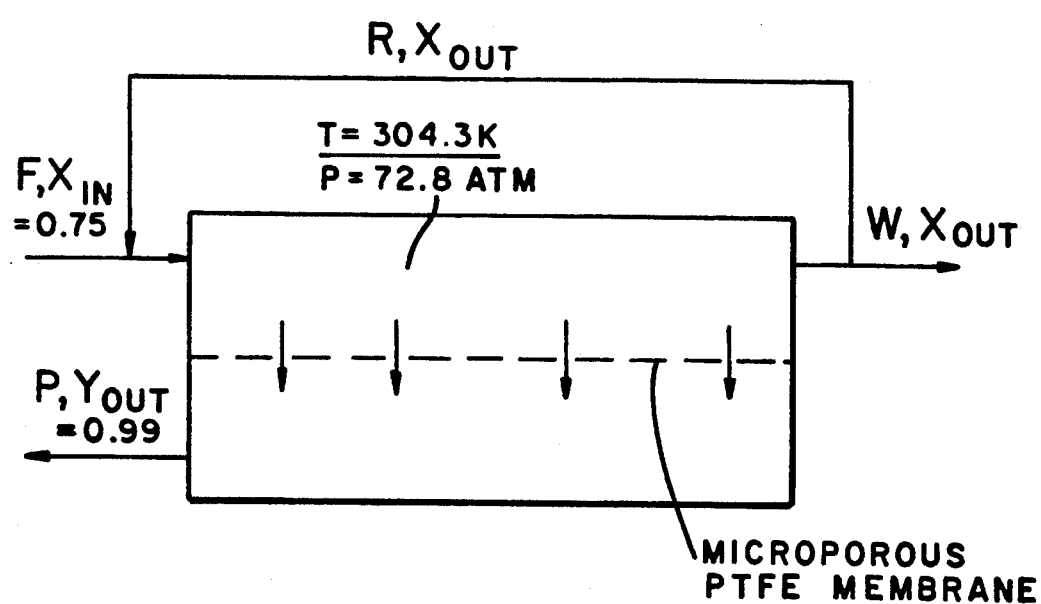
FIG. 4 is a diagram of a separation process for the dilute repulsive gas mixture of $H_2$ from shifted synthesis gas.

which is 75% $H_2$ and 25% $CO_2$. Assuming that a 1% $H_2$ in $CO_2$ mixture is determined to be the optimum dilute, repulsive, supercritical mixture for separation, and that a product stream P of 99% $H_2$ is desired, the process for separation is shown in FIG. 4 For a feed rate F of 1 kg/h and a recycle rate of 100 kg/h and where $x_{in} = 0.75$, the $H_2$ concentration of the byproduct stream W would be $x_{out} = 0.027$. The 99% H product stream P would flow out at 0.751 kg/h and the byproduct stream W would flow out at 0.249 kg/h.

EXAMPLE 5

Deuterated water, HDO, accounts for 0.030% of water found in nature. The second phase can be any nonvolatile solid that undergoes a reversible hydration reaction, such as porous calcium sulphate, commercially available under the tradename Drierite. Water is equilibrated very close to 647.14K and 22.048 MPa in contact with the solid. The HDO is preferentially expelled from the near-critical fluid phase and is enriched in the water of hydration associated with the solid. The degree of enrichment could be increased by approaching the critical point conditions more closely, an economic optimum being selected between degree of enrichment desired versus the cost of controlling the system with required precision. After equilibration the H$_2$O is flashed off rapidly and the enriched water of hydration is recovered from the solid by reversing the hydration reaction by heating.

I claim:

1. In a solution comprising a solute and a solvent wherein molecules of said solute exhibit repulsive or weakly attractive behavior relative to molecules of said solvent as the critical point of said solvent is approached, a process for separating said solute from said solvent comprising:

bringing a dilute solution of said solute and said solvent to a temperature and pressure approaching the critical point of said solvent thus effecting a maximization of solute fugacity;

separating said solute from said solvent by contacting said solution with a medium, said medium having the capacity to admit solvent and its negligible insolubility in said solution.

2. The process of claim 1 wherein said repulsive or weakly attractive behavior is effected from a mixture that is not a dilute repulsive or weakly attractive mixture, by recycling said solute product or byproduct stream comprising said solution depleted in said solute product at a sufficient rate to change the concentration of said mixture to convert it to a dilute repulsive or weakly attractive solution.

3. The process of claim 2 wherein said solute comprises a dilute isotope and said solvent is the same chemical identity but comprises a predominant isotope.

4. The process of claim 2 wherein said solute is $^{235}$UF$_6$ and said solvent is $^{238}$UF$_6$.

5. The process of claim 2 wherein said solution is air, said solute is O$_2$ and said solvent is N$_2$.

6. The process of claim 2 wherein said solution is shifted synthesis gas, said solute is H$_2$O and said solvent is CO$_2$.

7. The process of claim 1 wherein said solute comprises a dilute isotope and said solvent is the same chemical identity but comprises a predominant isotope.

8. The process of claim 1 wherein said medium is selected from the group consisting of a permeable membrane, a nonvolatile solid with which said solute reacts reversibly and a nonvolatile solid sorbent capable of sorbing said solute.

9. The process of claim 8 wherein said permeable membrane is microporous polytetrafluoroethylene.

10. The process of claim 8 wherein said nonvolatile solid with which said solute reacts reversibly is calcium sulphate, said solute is HDO and said solvent is H$_2$O.

11. The process of claim 8 wherein said solid sorbent is selected from the group consisting of a molecular sieve and activated carbon.

12. The process of claim 1 wherein said solute is $^{13}$CF$_4$ and said solvent is $^{12}$CF$_4$.

* * * * *